March 14, 1967 L. N. WILDER 3,309,148
COMBINATION VACUUM-PRESSURE, PARTICULATE
MATERIAL CONVEYING AND BLENDING SYSTEM
Filed Feb. 25, 1966 3 Sheets-Sheet 1

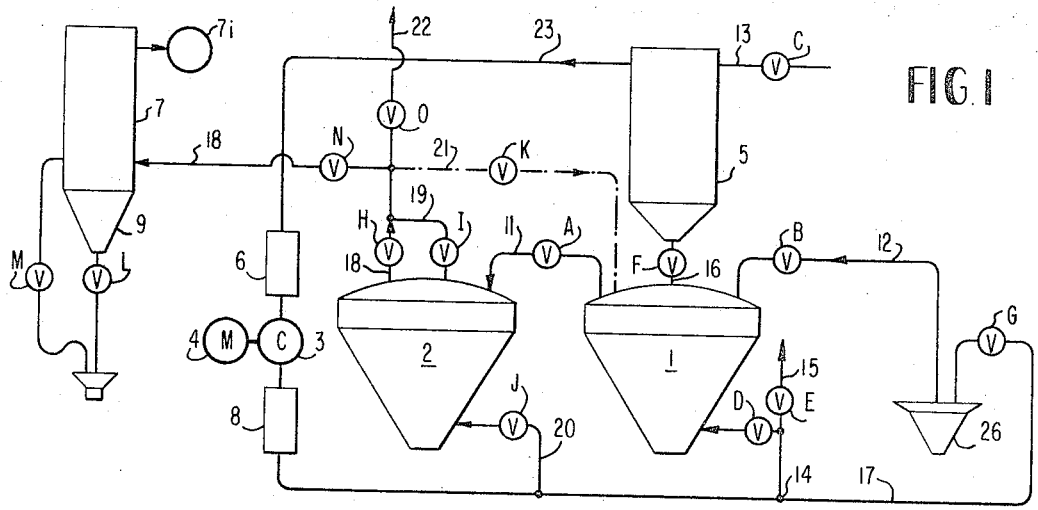

FIG. 1

| VALVE | | START | FILL | BLEND | RECYCLE | DISCHARGE |
|---|---|---|---|---|---|---|
| DISCHARGE | A | X | X | 0 | X | X |
| SUCTION | B | X | 0 | X | X | X |
| ATMOSPHERE | C | 0 | X | 0 | 0 | 0 |
| PRESSURE | D | X | X | 0 | X | X |
| ATMOSPHERE | E | 0 | 0 | X | X | X |
| FILTER | F | X | 0 | X | 0 | X |
| AERATION | G | X | 0 | X | X | X |
| DISCHARGE | H | X | X | X | 0 | 0 |
| VENT | I | X | X | 0 | X | X |
| PRESSURE | J | X | X | X | 0 | 0 |
| RECYCLE | K | X | X | X | 0 | X |
| DISCHARGE | L | X | X | X | X | 0 |
| VENT | M | X | X | X | X | 0 |
| DISCHARGE | N | X | X | 0 | X | 0 |
| BY-PASS | O | X | X | X | X | X |

0 = OPEN  X = CLOSED

FIG. 2

INVENTOR
LEE N. WILDER
BY Burns, Doane, Benedict, Swecker & Mathis
ATTORNEYS

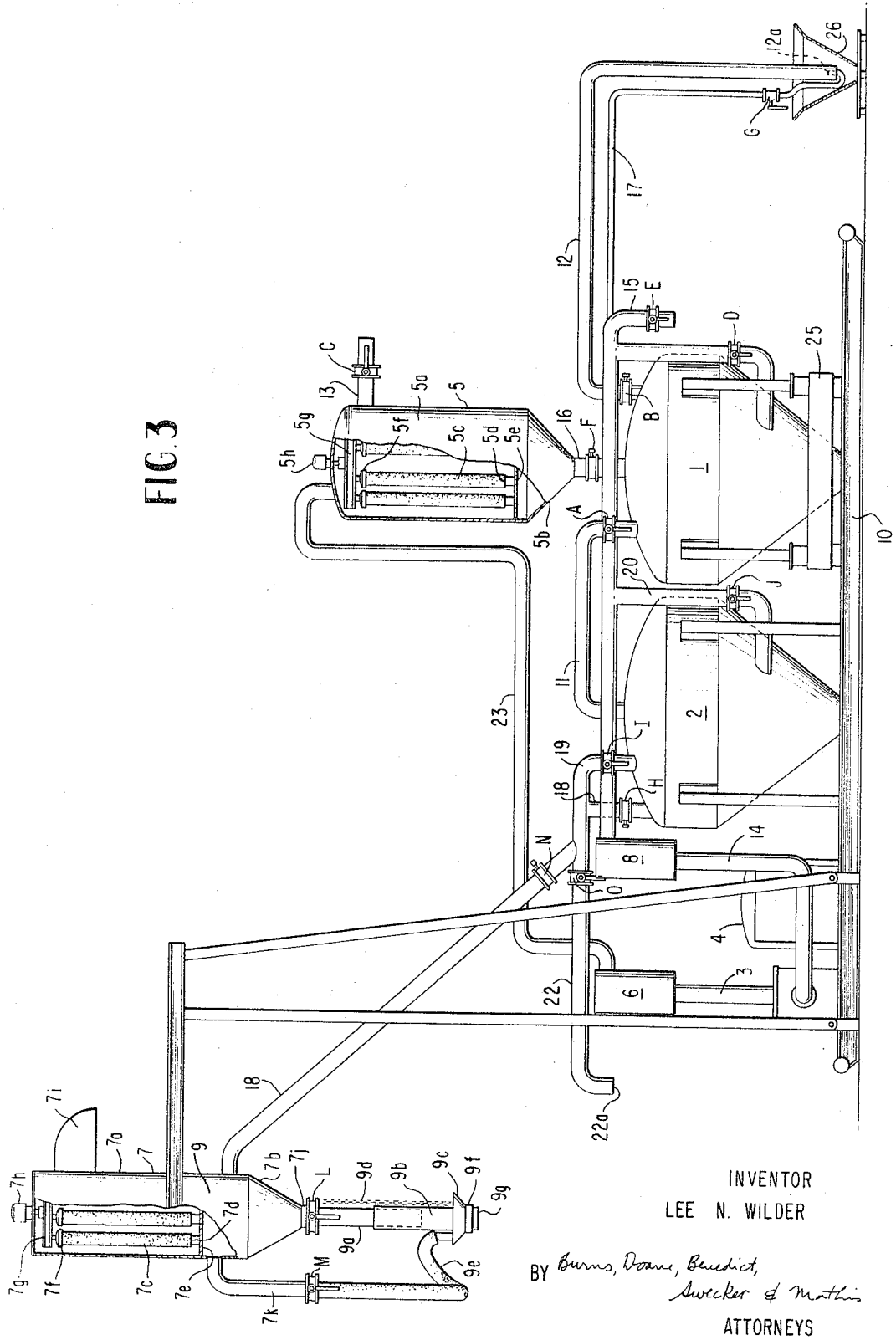

March 14, 1967 L. N. WILDER 3,309,148
COMBINATION VACUUM-PRESSURE, PARTICULATE
MATERIAL CONVEYING AND BLENDING SYSTEM
Filed Feb. 25, 1966 3 Sheets-Sheet 3

INVENTOR
LEE N. WILDER

BY *Burns, Doane, Benedict,*
*Swecker & Mathis*
ATTORNEYS

United States Patent Office 3,309,148
Patented Mar. 14, 1967

3,309,148
COMBINATION VACUUM-PRESSURE, PARTICULATE MATERIAL CONVEYING AND BLENDING SYSTEM
Lee N. Wilder, Duncan, Okla., assignor to Halliburton Company, Duncan, Okla., a corporation of Delaware
Filed Feb. 25, 1966, Ser. No. 529,978
10 Claims. (Cl. 302—53)

This invention relates to a system for employing both vacuum and pressure in the conveying and/or blending of material.

In particular it relates to the utilization of vacuum to transfer pulverulent materials, under the influence of vacuum, from a source to an intermediate receptacle and the subsequent utilization of pressurized gas to transfer the material from the intermediate tank to a storage or use location.

It has long been known to employ pneumatic systems to effect the conveying and handling of pulverulent material such as cement, sand, grain, etc.

It has also been known to utilize such a system to transfer material by utilizing a combination of a vacuum and pressure during a two-stage handling operation. For example, Smith Patent 279,034 early disclosed the concept of utilizing vacuum to transfer particulate material to an intermediate station and thereafter utilize pressurized air to move the material to another location.

It has also been known to mount combination, vacuum-pressure transfer systems on a unitary portable support as contemplated, for example, in Smith Patent 279,034.

In addition, as is set forth in Pyle et al. Patent 2,884,231, it has previously been recognized that pulverulent or particulate materials may be blended by shifting them back and forth between multiple receptacles under the influence of pneumatically induced flow.

Nevertheless the need has persisted for devices which would accomplish pneumatic transferring and blending operations with minimized manipulation and with improved efficiency.

Accordingly, it is a primary object of the present invention to provide a combination vacuum-pressure system which is characterized by fixed conduits and receptacles integrated into an efficient, easy to operate, and portable assembly.

A still further object of the invention is to provide such a vacuum-pressure system for handling particulate materials including check valve nozzle arrangements incorporated in a plural blending tank system so as to significantly minimize the possibility of nozzle clogging during the transfer of material from one tank to another.

Yet another object of the invention is to effect a unique utilization of such check-valved nozzle units in the basic context of a combination, vacuum-pressure transfer system so as to minimize the possibility of clogging the tank pressurizing nozzles when material is being drawn into the tank under the influence of vacuum.

It is also an object of the invention to provide an apparatus which effects a unique utilization of a closed cycle circulation of at least some of the air utilized in a pneumatic conveying system of particulate material.

It is also an object of the invention to utilize, in a novel fashion, multiple filters in a vacuum-pressure system for handling particulate materials so as to achieve maximum safety consistent with a high flow rate of material and high rate of particle extraction in filtering or venting units.

Yet another object of the invention is to provide a unique, vented, laterally flexible, discharge nozzle assembly in combination with a vacuum-pressure conveying system so as to improve discharge efficiency and safety.

It is likewise an object of the invention to provide a new, fixed conduit, multiple tank, vacuum-pressure transfer system capable of effecting the transfer, blending and weighing of particulate material with improved efficiency and ease.

It is also an object of the invention to provide a unique arrangement of an air inlet in a filter unit of a multiple tank, pneumatic blending system so as to enable filtered venting to take place during the blending of material but to also enable the direct entry of air into the system during a vacuum induced initial inflow of material into the system.

In accomplishing some of the objects of this invention there is contemplated an apparatus comprising a closed receptacle, gas pump means, and first conduit means for discharging material from the interior of the receptacle means. Second conduit means included in the apparatus serve to transmit or feed material to the receptacle. Third conduit means in the apparatus may be associated with a first filter so as to provide fluid communication between the filter and the atmosphere. In one preferred embodiment of the invention the first filter may have a plurality of cylindrically walled, fabric, and parallel filtering units.

In this same preferred embodiment of the apparatus there may be provided a nozzle unit within the receptacle means having a plurality of check-valved nozzles for directing pressurized gas generally downwardly into the receptacle means and around the first conduit means.

Fourth conduit means included in the apparatus serves to discharge gas from the pump to the interior of the receptacle means, preferably through the nozzle unit above-described. Fifth conduit means in the apparatus extends from the fourth conduit means and is adapted to communicate with the atmosphere. Sixth conduit means included in the apparatus extends from the receptacle to the first filter and supports the first filter.

A second filter unit is incorporated in the apparatus and additional conduit means in the apparatus extend in consecutive fluid communication from the intake of the pump to the second filter and then to the first filter. Preferably the filter units of the first filter are disposed relative to the additional conduit means and the sixth conduit means so as to compel gas to flow through the cylindrical wall portions of the filter units in moving from the receptacle to the additional conduit means.

In order to enable this structural combination to be effectively utilized with fixed conduits and a fixed receptacle so as to selectively effect vacuum or pressure transfer operations, the apparatus includes first valve means in the first conduit means, second valve means in the second conduit means, third valve means in the third conduit means, fourth valve means in the fourth conduit means, fifth valve means in the fifth conduit means, and sixth value means in the sixth conduit means.

Another independently significant facet of the invention, in the context of the basic features of the aforementioned combination, involves the utilization of valved seventh conduit means extending from the fourth conduit means and adapted to provide pressurized, material entraining air in the general location where material is being introduced under the influence of vacuum into the second conduit means.

A still further independently significant facet of the invention involves the basic combination above-described, augmented by a second closed receptacle including a nozzle unit such as that incorporated in the first receptacle means so as to facilitate the blending of material by effecting the pneumatic transfer of material between the first and second receptacles.

Another independently significant apparatus concept presented through the invention entails the above-noted basic combination wherein the first receptacle is associated with weighing means, wherein the pump means is provided with permanently integrated motor means, wherein multiple filters are incorporated in the system, and wherein the entire apparatus is skid mounted.

A still further individually significant facet of the invention entails any of the aforementioned combinations augmented by a unique discharge nozzle assembly which is telescoping, laterally flexible, filtered, and vented.

Yet another individually significant facet of the invention pertains to any of the foregoing combinations augmented by a unique air intake arrangement in the first filter by means of which air may bypass the filter units of the first filter during the intake of air to effect the vacuum induced intake of material into the system and to allow the filtered venting of air in the first receptacle while pressurized air is being supplied into its interior to effect the pressurized discharge of material from the first receptacle.

In describing the invention, reference will be made to a preferred embodiment shown in the appended drawings.

In the drawings:

FIGURE 1 is a schematic flow diagram illustrating the basic components of a preferred embodiment of the apparatus system and the flow pattern of material through the system during various sequential phases of a material handling operation;

FIGURE 2 schematically illustrates the positioning of the various valves in the FIGURE 1 system, showing when these valves are closed or open in relation to particular phases of the material handling operation;

FIGURE 3 is a somewhat more detailed schematic, elevational view of a portable installation including the components of the system shown in the flow diagram of FIGURE 1;

Figure 4:
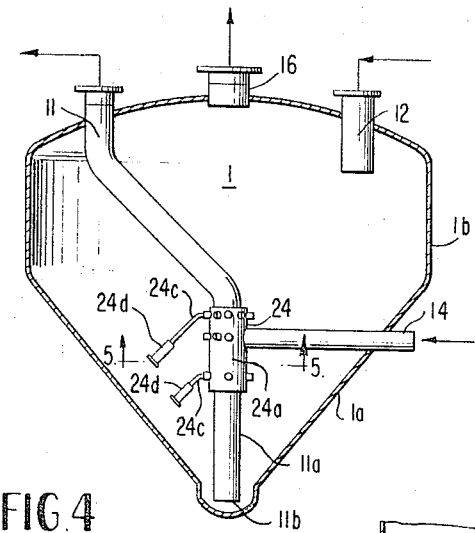
FIGURE 4 is a vertical sectional view through the primary receptacle or tank of the FIGURE 3 installation.

As shown in FIGURES 1 and 3, basic components of the system comprise a closed primary receptacle 1, a closed secondary receptacle 2, a conventional gas pump or compressor 3, and a conventional motor or engine 4 for driving the gas pump 3.

The apparatus additionally includes a first filter 5, a second filter 6, a third filter 7 and a fourth filter 8.

The third filter 7 is integrated in a discharge nozzle assembly 9.

Components 1 through 10 and the conduits interconnecting these components are mounted on a skid assembly 10 as shown in FIGURE 3 such that the overall assembly is portable.

A first discharge conduit 11 extends from the interior of the primary receptacle 1 as shown in FIGURES 1 and 4 and discharges them into the upper end of the secondary receptacle 2.

A second conduit 12 serves to feed material of a particular nature such as cement, other powdered material, or coarse material such as sand, to the top interior of the primary receptacle 1 as shown in FIGURES 1 and 4.

A third conduit 13 is connected with the first filter 5 as shown in FIGURES 1 and 3 and is adapted to communicate with the atmosphere.

A fourth conduit 14 extends from the discharge side of the pump 3 and communicates with the interior of the primary receptacle 1 as generally shown in FIGURES 1 and 4.

A fifth conduit 15 extends from conduit 14 and is adapted to selectively communicate with the atmosphere.

A sixth conduit 16, as shown in FIGURES 1 and 3, provides a novel, space saving, and simplified support structure for mounting the first filter 5 on top of the primary receptacle 1 and provides fluid communication between the interior of the receptacle 1 and the interior of the filter 5.

A seventh conduit 17 branches from the fourth conduit 14 and is adapted to provide pressurized, material entraining air at the material inlet end 12a of the conduit 12.

An eighth conduit 18, which may be identical to the conduit 11 insofar as its structure within the secondary tank is concerned, extends from the interior of the secondary tank 2 and serves to convey aerated or pneumatically conveyed material out of the secondary tank 2.

A ninth conduit 19 extends between the upper end of the secondary receptacle 2 and the conduit 18 and serves to vent the upper end of the secondary receptacle 2.

A tenth conduit 20 branches from the conduit 14 and communicates with the interior of the secondary tank 2. Conduit 20 serves to supply pressurized air to the interior of the tank 2 in a manner generally identical to that in which the conduit 14 supplies pressurized air to the interior of the primary receptacle 1.

Although not shown in FIGURE 3, the apparatus may also include an additional, eleventh conduit 21 as shown in phantom line in FIGURE 1. Conduit 11 as shown in FIGURE 1 extends from discharge conduit 18 to the upper end of the primary receptacle 1. Conduit 21, when present, would serve to introduce material into the upper end of the receptacle 1 in a manner equivalent to that in which the conduit 12 serves to introduce material into this primary receptacle.

The apparatus may also include another, conduit 22 which functions as a discharge by-pass conduit and branches from the conduit 18 and extends to an open-ended discharge 22a.

Additional conduit means 23 extend in consecutive, fluid communicating relation from the intake of pump 3 through the second filter 6 and to the first or primary, and relatively high capacity filter 5.

Each of the first through eleven conduits, 11 through 21 respectively, is provided with a valve for controlling flow therethrough.

Thus, first conduit 11 is provided with a first, discharge valve A, second conduit 12 is provided with a suction controlling valve B, and third conduit 13 is provided with a third, communication - to - atmosphere - controlling, valve C.

Fourth conduit 14 is provided with a pressure controlling valve D, fifth conduit 15 is provided with a fifth, communication-to-atmosphere-controlling, valve E, while sixth conduit 16 is provided with a sixth, filter action controlling, valve F.

Seventh conduit 17 is provided with a seventh valve G for regulating air supplied to aerated material being picked up at the intake end 12a of the second conduit 12.

Eighth conduit 18 is provided with a discharge flow regulating eighth valve H.

Ninth conduit 19 is provided with a vent controlling ninth valve I, while tenth conduit 20 is provided with a tank pressure regulating tenth valve J.

Eleventh conduit 21 includes a material recycle-controlling, eleventh valve K.

Valves A, B, C, D, E, F, H, I, J and K may advantageously comprise conventional, manually operable, butterfly valves.

As shown in FIGURE 3, primary filter unit 5 comprises a generally cylindrical shell 5a, having a frustoconical lower end 5b which converges downwardly into connected relation with the filter supporting conduit 16.

Included within the interior of shell 5a are a plurality of parallel, vertically extending, and generally cylindrically walled, fabric filter units 5c. The lower open end 5d of each filter unit is supported on a fixed mounting plate 5e, having openings communicating with openings in the lower ends of the filter units 5c.

The closed upper ends 5f of the filter units are connected with a frame 5g, which is supported on a vibrator 5h. Vibrator 5h may comprise a conventional air motor, operated by air extracted from conduit 14. Motor 5h may serve to provide lateral vibration to the frame 5g so as to impart a lateral shaking action to the filters 5c.

Conduit 16 and conduit means 23 are disposed, relative to filter units 5c, such that a vent flow from the primary receptacle 1, upwardly through the conduit 16, will pass upwardly into the interior of the filter units 5c and then laterally through the walls of the filter units 5c and into the conduit 23 as a filtered gas. The conduit 13 is arranged relative to the filter units 5c such that it will allow atmospheric gas to enter the filter 5 and flow around the exterior of, or bypass, the filter units 5c and flow directly to the conduit means 23.

As will be appreciated, the filter units 5c provide a large filtering area so as to enable a high volume flow of gas to be accommodated and filtered. During periods of the operation of the unit when gas is not being flowed through the filter units 5c, the vibrator motor 5h may be operated so as to free the filter units of accumulated particulate material previously extracted during filtering operation. Such freed material will, of course, fall downwardly and return to the interior of the primary receptacle 1.

Filter units 6 and 8 may each comprise conventional gas filters including replaceable filter cartridges which serve to extract particulate material from a gas flow. Filter 6, which is located in conduit 23 between filter 5 and pump or compressor 3, functions primarily in a safety capacity. Filter 6, which has a low filtration capacity relative to filter 5, prevents the entry of particulate material into the pump or compressor 3 in the event that one of the high capacity filter units 5c should become ruptured or otherwise damaged. Filter 8, which is located in conduit 14 between pump or compressor 3 and conduit 20, also serves in a safety capacity. Filter 8 prevents any backflow of particulate material into the discharge end of the pump or compressor 3. Such a backflow tendency might result, for example, when the pump or compressor 3 was shut down, but pressure still existed in the conduit 14.

Filter 7 comprises a unit which is somewhat smaller than, but identical in operating principle to, the filter unit 5. Thus, filter 7 includes a generally cylindrical shell 7a, having a closed upper end and a downwardly converging, frustoconical lower end 7b. A plurality of parallel cylindrically walled fabric filtering units 7c are supported within the shell 7a with the lower filter unit ends 7d fixed in position on a perforate mounting plate 7e and the upper filter unit ends 7f closed and connected with a frame 7g. Frame 7g in turn is connected with a vibrating motor 7h which may be air operated by air extracted from the conduit 14. Motor 7h may be operated when air is not being flowed through the filter units 7c so as to shake the units 7c laterally and free the filter units of previously accumulated particulate material.

As shown in FIGURE 3, discharge conduit 18 intersects shell 7a beneath the filter units 7c so as to facilitate the discharge of particulate material directly into the frustoconical, lower end 7b of the filter units 7. An air motor operated fan 7i may be mounted on the shell 7c so as to induce an outflow of gas from the interior of the shell 7c to the atmosphere. The motor for fan 7i may be operated by air extracted from the conduit 14.

Thus, air entrained material flowing through the conduit 18, upon entering the filter unit 7, will have the material entraining air drawn upwardly through the filter units 7c under the influence of the suction fan 7i with this extracted air being withdrawn to the atmosphere. With this arrangement, a densified particulate material discharge is formed at the discharge nozzle assembly 9, which includes the filter unit 7.

Discharge nozzle assembly 9 additionally includes a first, laterally flexible conduit section 9a which may be fabricated of reinforced, elastomeric material and which is connected on a cylindrical housing portion 7j projecting downwardly from the lower end of filter housing portion 7b. Discharge nozzle assembly 9 additionally includes a rigid, second conduit portion 9b, mounted for vertical telescopic movement on and beneath the flexible conduit portion 9a.

A coupling 9c is mounted on the lower end of the conduit portion 9b and is adapted to mate with conventional material inlets of the type frequently found on trucks. A flexible chain 9d extends from the coupling 9c to the filter unit 7 so as to prevent downward telescoping movement of the conduit portion 9b out of telescoping relation with the conduit portion 9a.

A flexible vent conduit 9e extends from the coupling 9c to an elbow fitting 7k which communicates with the interior of the shell 7a beneath the open lower ends of the filter units 7c. Flexible vent conduit 9e communicates with an annular cavity encircling the conduit portion 9b as defined by space between conduit portion 9b and a coupling shell portion 9f. This annular cavity opens downwardly so as to provide a generally annular vent encircling the lower discharge end 9g of the conduit 9b. Thus when the coupling 9c is coupled with a truck, particulate material is discharged into the truck through the discharge end 9g while air within the truck is vented or extracted through the flexible vent pipe 9e and drawn upwardly through the filter units 7c and returned to the atmosphere through the extraction fan 7i.

The telescoping character of the coupling portions 9a and 9b, coupled with the laterally flexible character of the conduit portion 9a and the vent conduit 9e, enables both vertical and lateral movements of the coupling 9c to take place relative to the filter unit 7. This facilitates the positioning of the coupling 9c relative to a truck opening and minimizes the incurring of structural damage to the discharge nozzle assembly 9 while the coupling 9c is engaged with a truck or being engaged or separated from a truck.

Flow through the conduit portion 9a may be controlled by a conventional twelfth valve L. Flow through flexible vent conduit 9a may be controlled by thirteenth system valve M of the apparatus. Valve L may be mounted, as shown, on elbow fitting 7k of filter 7 while valve M may be mounted on lower conduit stub 7j of this filter. Valves L and M may each comprise conventional manually operated butterfly type valves.

The flow of material into the discharge nozzle assembly 9 is controlled by fourteenth valve N of the system. Valve N which may comprise a conventional, manually operated, butterfly valve is incorporated in conduit 18 between valve I and the filter unit 7.

Where the system includes the bypass conduit 22, a fifteenth valve O is provided in this conduit 22 for the purpose of controlling flow therethrough as generally shown in FIGURES 1 and 3.

Each of the primary receptacles 1 and 2 is provided with a nozzle unit communicating respectively with the conduits 14 and 20 for directing a check-valved flow of tank pressurizing and material agitating air downwardly into the tank interiors. In describing these units, illustrative reference will be made only to the nozzle unit 24 in the primary receptacle 1 as show in FIGURES 4 and 5, it being understood that the nozzle unit in the secondary receptacle 2 is generally identical to the nozzle unit 24.

Nozzle unit 24 comprises an annular manifold 24a, closed top and bottom, and mounted on a vertically extending lower end 11a of the conduit 11, as shown in FIGURE 4. Conduit end 11a has an open lower terminus 11b disposed near the lower end of the receptacle 1.

Figure 5:
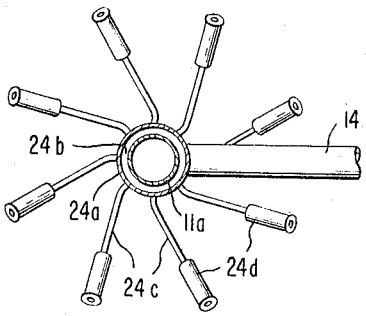
FIGURE 5 is a horizontal sectional view of a nozzle unit of the FIGURE 4 tank as viewed along the section line 5—5 of FIGURE 4.

Conduit 14 intersects a frustoconical downwardly converging wall portion 1a of the receptacle 1 and communicates with the manifold 24a. Manifold 24a provides an annular, air distributing space 24b encircling a portion of the conduit portion 11a as generally shown in FIGURE 5. Air from the space 24b flows outwardly through a plurality of pipes 24c, each of which is directed relative to the receptacle wall 1a so as to create a somewhat vortical flow pattern within the lower end of the receptacle. Each pipe 24c is provided with a check valved nozzle 24d at its outer extremity to allow an outflow of air from the pipe 24c but prevent a backflow of material or air into the pipe 24c. Each check valved nozzle 24d preferably is of the type described and claimed in Knight Patent 3,103,389.

As is further schematically shown in FIGURE 4, receptacle 1 may be provided with a generally cylindrical, side wall portion 1b extending upwardly from the frustoconical wall portion 1a and a domed roof portion 1c. All conduits intersecting the receptacle 1 intersect wall portions thereof in sealed relation such that the receptacle 1 comprises a closed, material reservoir capable of maintaining either a sub or super ambient pressure condition.

In this connection it will be understood that the wall structure of receptacle 2 conforms substantially to that of the receptacle 1 and that the receptacle 2 is also constructed so as to be able to maintain a pressurized condition within its interior.

As is schematically shown in FIGURE 3, primary receptacle 1 is mounted on a weighing device 25. Weighing device 25 may comprise a conventional tank scale such as for example the 25,000 lb. gross capacity tank scale manufactured by the Winslow Government Standard Scale Works, Inc., of Terre Haute, Ind.

As shown in FIGURE 3, the skid 10 serves to support the primary receptacle 1, the weighing device 25, the secondary receptacle 2, the filter units of the apparatus, the discharge assembly 9, and the critically arranged conduits and valves associated with these elements of the apparatus for movement as an integrated, portable unit.

Material may be supplied to the conduit 12 by a variety of arrangements.

As shown, for example, in FIGURE 3, conduit 12 may terminate in a vertically extending portion 12a having an open lower end. Conduit 17, which may be smaller in diameter than the conduit 12, projects slightly in to the open lower end of the conduits 12 as generally shown in FIGURE 3 so as to discharge air axially upwardly into conduit 12.

The inter-related conduits 12 and 17 may be disposed within a material receiving hopper 26. This hopper may receive, for example, material such as cement and cement additives from bags. With the presence of a vacuum or subambient pressure within the conduit 12, and with conduit 17 providing a flow of material entraining air, particulate material within the hopper 26 will be drawn upwardly and pneumatically conveyed through the conduit 12 to the primary receptacle 1.

Figure 6:
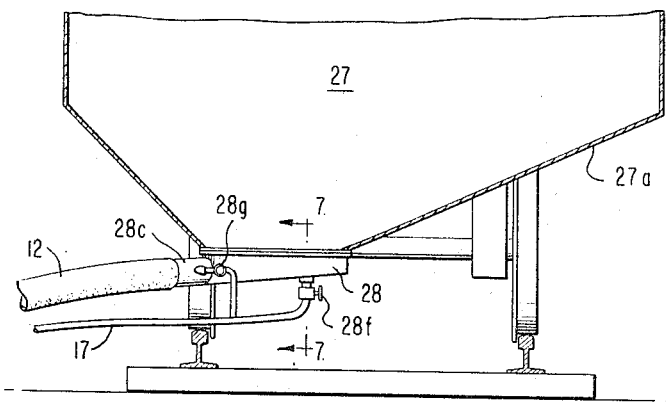
FIGURE 6 is a schematic and fragmentary illustration of a modification of the installation shown in FIGURE 3 adapted to receive incoming material from a railway car.
Figure 7:
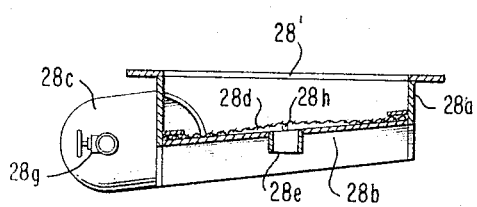
FIGURE 7 is a vertical sectioned view of the FIGURE 6 installation as viewed along section line 7—7 of FIGURE 6.
Figure 8:
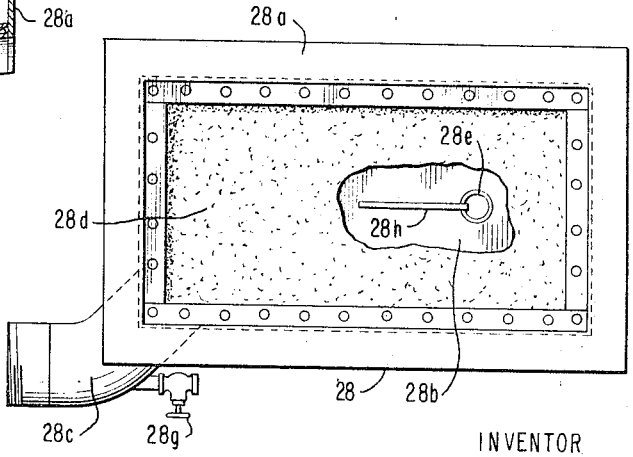
FIGURE 8 is an enlarged plan view of the material receiving unit shown partially in section in FIGURE 7.

FIGURES 6, 7 and 8 illustrate an alternative arrangement for providing material to the basic supply conduit 12.

As shown in FIGURE 6, a railway car 27 may be provided with a unit 28 which serves to couple a hopper portion 27a of the railway car to the conduits 12 and 17.

Coupling 28 may comprise a generally rectangular trough 28a, having an open upper end 28' communicating with the interior of the hopper 27a. Trough 28a may have a solid bottom wall or plate 28b which slopes downwardly toward a corner outlet having an elbowed, conduit fitting 28c. Conduit fitting 28c is connected with the feed or supply conduit 12.

A gas permeable, canvas sheet 28d is superposed over the floor 28b of the trough 28a, with the conduit fitting 28c entering the trough 28a above the canvas sheet 28d.

As schematically shown in FIGURES 7 and 8, a rod 28h may extend away from the outlet of the coupling 28e and be interposed between the trough base 28b and the canvas, air permeable sheet 28d. This rod arrangement serves to provide an immediately broadened distribution of air underneath the canvas sheet 28d. In this manner a broadly distributed, upward flow of material aerating gas through the sheet 28d is assured. It will be understood of course that the canvas sheet 28d will substantially prevent any migration of particulate material downwardly through the sheet.

Conduit 17 is connected with a nipple fitting 28e which intersects the base 28b of the trough beneath the canvas sheet 28d. A conventional valve 28f may be incorporated in the conduit 17, as generally shown in FIGURE 6, so as to control the flow of gas or air to the fitting 28e.

Conduit 17 may branch, as shown on FIGURE 6, to communicate with conduit 12 through coupling 28c. A conventional valve 28g may be provided as shown in FIGURE 6 to regulate the flow of pressurized air from the conduit 17 into the coupling 28c.

Pulverulent material such as cement within the hopper 27a will gravitate downwardly toward the canvas sheet 28d. Air flowing upwardly through the sheet 28d from the conduit 17 will serve to aerate this material within the unit 28. The aerated material will then be entrained and conveyed by gas flowing through the conduit 12. In this connection it will be appreciated that pressurized air supplied to the coupling 28c will materially contribute to the immediate entraining and conveying away of the material aerated within the unit 28.

Unit 28 may be detachably coupled to either the railway car 27 or the conduits 12 and 17 through the use of conventional fastening means, not shown.

A variety of other devices may be employed for effecting the entry of particulate material into the conduit 12. For example, closed supply tanks may be utilized similar to that shown in FIGURE 4. In such arrangements the conduit 12 would extend into the tank in the manner that the conduit 11 extends into the primary receptacle 1. In such supply structures, the aerating conduit 17 may be connected with a nozzle unit such as the nozzle unit 24 shown in FIGURE 4 so as to supply material entraining air to the interior of the supply receptacle and facilitate the vacuum discharge of material.

With the structure of the apparatus having been described, the mode of operation of the invention may now be considered.

FIGURE 2 provides a chart illustrating the open and closed positions of the various valves of the apparatus during various phases of the operation.

In starting the system valves C and E are opened so as to enable the pump or compressor 3 to induce a free flow of air through the system, with air being drawn in through the conduit 13 of the filter 1 and being discharged to atmosphere through the branch conduit 15.

With valves B, E, F and G open and the remaining valves closed, material may be withdrawn from the supply source such as the hopper 26 and conveyed through the conduit 12 into the primary receptacle 1.

During this filling portion of the cycle, material is pneumatically conveyed through the conduit 12 into the receptacle 1, with the material conveying air being withdrawn and filtered through the filter 1. In this connection, it is important to note that a portion of the air which serves to entrain and convey material through the conduit 12 is returned through the conduits 14 and 17 to the supply hopper 26, or other supply source, for subsequent material entraining. Thus, in a sense, a portion of the material conveying air recycles through the system.

After material has been drawn into the primary receptacle 1, the weighing device 25 will provide an indication of the weight of material drawn into the system.

As will be appreciated, diverse or different materials may be drawn into the conduit 12 from the supply source. This would occur, for example, when cement and cement additives were emptied from separate sources into the supply hopper 26.

In order to effect the blending or interspersing of the diverse materials drawn into the hopper or primary receptacle 1, the material is moved from the primary receptacle 1 to the secondary receptacle 2 for blending purposes.

During this blending portion of the operating cycle, valves A, C, D, I and N are open with the remaining valves being closed.

During the blending portion of the cycle, pressurized air is introduced into the receptacle 1 through the nozzle unit 24. This pressurized air not only serves to force material into the conduit 11 where it is entrained and conveyed to the secondary receptacle 2, but also effects a mixing of the diverse materials within the tank 1. This mixing results from the utilization of the jetting nozzles 24d which create a jetted, vortical air pattern to agitate the material as it is being pressurized and air entrained. As will be noted by reference to FIGURE 3, this agitation and intermixing is intensified by imparting a vortical and progressively intensifying or tightening flow pattern to the materal in the lower end of the downwardly converging frustoconical portion of the receptacle 1.

As material enters the secondary receptacle 2, the material entraining air is vented through the open valves I and N to the filter unit 7.

In some instances, in order to effect further mixing or blending of diverse materials, it may be desirable to recycle material from the receptacle 2 back to the receptacle 1 and then return the material from the receptacle 1 to the receptacle 2.

Movement from the receptacle 2 to the receptacle 1 is accomplished with valves C, F, H, J and K open and the remaining valves closed. During this recycling, the jet nozzles within the secondary receptacle 2 effect the agitation and air entrainment of material, with the result that the material is pneumatically returned through the conduit 21 to the receptacle 1. Material entraining air, on entering the primary receptacle 1 during the cycle phase of the operation, is vented and filtered through the primary filter 1 and returns to the atmosphere through the conduit 13.

Material is returned from the tank 1 to the tank 2 as above described.

After blending or recycling, material is discharged from the blending tank 2 with the valves C, H, J, L, M and N open and the remaining valves closed. During this discharge phase of the operating cycle, the nozzle unit within the secondary receptacle 2 effects the pressurization and pneumatic entrainment of material and conveys the material out of the receptacle 2 and through the conduit 18 to the discharge nozzle assembly 9. The material entraining air flowing through the conduit 18 is extracted through the filter unit 7.

In the event that it is desired to discharge material through the by-pass conduit 22, the valves C, H, J and O will be open with the remaining valves closed.

In describing the structure and mode of operation of the invention, its several advantages have been demonstrated, however, in brief review, it will be appreciated that a prime advantage of the invention resides in a particularly effective arrangement of receptacles, conduits and valves by means of which a combination vacuum and pressure transfer of material may be effected with maximized simplicity and efficiency, minimum possibility of error, and nominal manipulating effort and without shutting down or changing the operation of the pump or compressor.

The unique placement of multiple filters of diverse characteristics within the system provides a high degree of safety for the system energizing pump or compressor and enables the reutilization of material entraining air.

The utilization of the generally radial arrangement of check valved nozzles in combination with frustoconical tank portions in the system provides a highly effective, material entraining and mixing arrangement.

The utilization of the check valved nozzles is significant in that it serves to prevent the clogging of the pressurizing nozzles when material is being drawn into the tanks.

The discharge nozzle assembly comprises a significantly advantageous facet of the invention. This structure efficiently separates material entraining air from material being discharged and provides, as well, a nozzle assembly capable of both axial and lateral adjustability. The filter elements of the discharge assembly may be cleaned of accumulated material at opportune moments during the overall operating cycle without removing the filters from the discharge assembly.

The novel arrangement of the air inlet in the primary filter unit enables air to be drawn from the atmosphere and supplied to the compressor or pump without passing through the filter units so as to facilitate the supplying of air to the compressor or pump unit. However, when aerated material is being recycled through the primary receptacle, material entraining air passing into the primary filter must of necessity pass through its high capacity filter units in returning to the atmosphere through the same air inlet conduit.

Other advantages of the invention reside in the unique arrangements described for aerating and entraining material at a supply source where material is fed to the primary receptacle.

An additional advantage resides in the disposition of filters 7 and 5 relative to the blending or secondary receptacle 2. This disposition allows the filtered venting of the receptacle 2 but prevents the discharge of filtered-out material back into this receptacle. This advantageously prevents possible contamination of subsequent changes of material supplied to the system and tends to ensure the presence of uniform blended material within the tank or receptacle 2.

The utilization of manually operated butterfly valves is also noteworthy in that it provides a virtually foolproof and easily and quickly operated valve system for rapidly and positively opening and closing conduits within the system to change from one phase of a transfer operation to the other.

The fullest and most advantageous utilization of the invention results from the employment of the entire preferred embodiment. However, in certain instances, as for example, when blending is not an important factor, the system may be modified by the deletion of the blending tank. In addition, where weighing is not a factor to be considered, the weighing device may be deleted from the overall apparatus.

In describing the invention, reference has been made to preferred embodiments. However, those familiar with the disclosure of the invention and skilled in the pneumatic conveying and material handling art may well recognize additions, deletions, substitutions or other modifications of the preferred embodiment which would fall within the purview of the invention as defined in the appended claims.

I claim:

1. An apparatus for handling particulate material, said apparatus comprising:
    closed receptacle means;
    gas pump means;
    first conduit means adapted to discharge particulate material from the interior of said receptacle means;
    second conduit means adapted to supply particulate material to the interior of said receptacle means;

pressurizing means within said receptacle means for discharging pressurized gas thereinto;
a first filter carried by and on top of said receptacle means;
a second filter;
third conduit means connected with said first filter and adapted to provide communication with the atmosphere;
fourth conduit means connected with said gas pump means so as to receive the discharge thereof and additionally connected with said pressurizing means so as to convey gas discharged from said pump means to said pressurizing means;
fifth conduit means communicating with said fourth conduit means and adapted to provide communication with the atmosphere;
sixth conduit means extending from said receptacle means to said first filter;
additional conduit means in consecutive gas transmitting communication with the intake of said gas pump means, said second filter, and said first filter;
first valve means in said first conduit means;
second valve means in said second conduit means;
third valve means in said third conduit means;
fourth valve means in said fourth conduit means;
fifth valve means in said fifth conduit means; and
sixth valve means in said sixth conduit means.

2. An apparatus for handling particulate material, said apparatus comprising:
closed receptacle means;
gas pump means;
first conduit means adapted to discharge particulate material from the interior of said receptacle means;
second conduit means adapted to supply particulate material to the interior of said receptacle means;
a nozzle unit disposed within said receptacle means and having a plurality of check-valved nozzles for directing pressurized gas generally downwardly into said receptacle means and around first said conduit means;
a first filter carried by and on top of said receptacle means;
a second filter;
third conduit means connected with said first filter and adapted to provide communication with the atmosphere;
fourth conduit means connected with said gas pump means so as to receive the discharge thereof and additionally connected with said nozzle unit so as to convey gas discharged from said pump means to said nozzle unit;
fifth conduit means communicating with said fourth conduit means and adapted to provide communication with the atmosphere;
sixth conduit means extending from said receptacle means to said first filter and comprising means for supporting said first filter on said receptacle means;
additional conduit means in consecutive gas transmitting communication with the intake of said gas pump means, said second filter, and said first filter;
first valve means in said first conduit means;
second valve means in said second conduit means;
third valve means in said third conduit means;
fourth valve means in said fourth conduit means;
fifth valve means in said fifth conduit means; and
sixth valve means in said sixth conduit means.

3. An apparatus for handling particulate material, said apparatus comprising:
closed receptacle means;
gas pump means;
first conduit means adapted to discharge particulate material from the interior of said receptacle means;
second conduit means adapted to supply particulate material to the interior of said receptacle means;
pressurizing means disposed within said receptacle means for discharging pressurized gas thereinto;
a first filter carried by and on top of said receptacle means and including a plurality of cylindrically walled, parallel, fabric filtering units;
a second filter;
third conduit means connected with said first filter and adapted to provide communication with the atmosphere;
fourth conduit means connected with said gas pump means so as to receive the discharge thereof and additionally connected with said pressurizing means so as to convey gas discharged from said pump means to said pressurizing means;
fifth conduit means communicating with said fourth conduit means and adapted to provide communication with the atmosphere;
sixth conduit means extending from said receptacle means to said first filter and comprising means for supporting said first filter on said receptacle means;
additional conduit means in consecutive gas transmitting communication with the intake of said gas pump means, said second filter, and said first filter, with the filter units of said first filter being disposed relative to said additional conduit means and said sixth conduit means to compel gas to flow through wall portions of said plurality of filter units in moving from said receptacle means through said first filter unit to said additional conduit means;
first valve means in said first conduit means;
second valve means in said second conduit means;
third valve means in said third conduit means;
fourth valve means in said fourth conduit means;
fifth valve means in said fifth conduit means; and
sixth valve means in said sixth conduit means.

4. An apparatus for handling particulate material, said apparatus comprising:
closed receptacle means;
gas pump means;
first conduit means adapted to discharge particulate material from the interior of said receptacle means;
second conduit means adapted to supply particulate material to the interior of said receptacle means;
a nozzle unit disposed within said receptacle means and having a plurality of check-valved nozzles for directing pressurized gas generally downwardly into said receptacle means and around first said conduit means;
a first filter carried by and on top of said receptacle means and including a plurality of cylindrically walled, parallel, fabric filtering units and motor means for shaking said units;
a second filter;
third conduit means connected with said first filter and adapted to provide communication with the atmosphere;
fourth conduit means connected with said gas pump means so as to receive the discharge thereof and additionally connected with said nozzle unit so as to convey gas discharged from said pump means to said nozzle unit;
fifth conduit means communicating with said fourth conduit means and adapted to provide communication with the atmosphere;
sixth conduit means extending from said receptacle means to said first filter and comprising means for supporting said first filter on said receptacle means;
additional conduit means in consecutive gas transmitting communication with the intake of said gas pump means, said second filter, and said first filter, with the filter units of said first filter being disposed relative to said additional conduit means and said sixth conduit means to compel gas to flow through wall portions of said plurality of filter units in moving from said receptacle means through said first filter unit to said additional conduit means;
first butterfly valve means in said first conduit means;

second butterfly valve means in said second conduit means;
third butterfly valve means in said third conduit means;
fourth butterfly valve means in said fourth conduit means;
fifth butterfly valve means in said fifth conduit means; and
sixth butterfly valve means in said sixth conduit means.

5. An apparatus as described in claim 4 additionally including:
seventh conduit means communicating with said fourth conduit means and adapted to provide pressurized, material entraining gas at a source of material to be flowed through said second conduit means to said receptacle means; and
seventh valve means in said seventh conduit means.

6. An apparatus as described in claim 5 and additionally including:
weight measuring means connected with said receptacle means;
motor means operably connected with said gas pump means;
a discharge nozzle assembly communicating with said first conduit means and having
a first, laterally flexible conduit portion mounted in fixed relation to said first conduit means,
a second conduit portion mounted for vertical telescoping movement on and beneath said first conduit portion,
a third filter having a plurality of parallel, cylindrically walled, fabric filter units and motor means for shaking said units,
a coupling mounted on the lower end of said second conduit portion, and
a flexible vent conduit extending from said coupling to said third filter;
a fourth filter in said fourth conduit means between said fourth valve means and said gas pump means; and
skid means supporting said apparatus for movement as a unit.

7. An apparatus for handling particulate material, said apparatus comprising:
closed, first receptacle means;
gas pump means;
first conduit means adapted to discharge particulate material from the interior of said first receptacle means;
second conduit means adapted to supply particulate material to the interior of said first receptacle means;
a first nozzle unit disposed within said first receptacle means and having a plurality of check-valved nozzles for directing pressurized gas generally downwardly into said first receptacle means and around first said conduit means;
a first filter carried by and on top of said first receptacle means and including a plurality of cylindrically walled, parallel, fabric filtering units;
a second filter;
third conduit means connected with said first filter and adapted to provide communication with the atmosphere;
fourth conduit means connected with said gas pump means so as to receive the discharge thereof and additionally connected with said first nozzle unit so as to convey gas discharged from said pump means to said first nozzle unit;
fifth conduit means communicating with said fourth conduit means and adapted to provide communication with the atmosphere;
sixth conduit means extending from said first receptacle means to said first filter and comprising means for supporting said first filter on said first receptacle means;
seventh conduit means communicating with said fourth conduit means and adapted to provide pressurized, material entraining gas at a source of material to be flowed through said second conduit means to said receptacle means;
additional conduit means in consecutive gas transmitting communication with the intake of said gas pump means, said second filter, and said first filter, with the filter units of said first filter being disposed relative to said additional conduit means and said sixth conduit means to compel gas to flow through wall portions of said plurality of filter units in moving from said receptacle means through said first filter unit to said additional conduit means;
closed, second receptacle means;
said first conduit means being arranged to discharge material into said second receptacle means;
eighth conduit means connected with said second receptacle means for discharging the material therefrom;
ninth conduit means connected with said second receptacle means and said eighth conduit means and adapted to vent gas from the interior of said second receptacle means into said eigthth conduit means;
a second nozzle unit disposed within said second receptacle means and having a plurality of check-valved nozzles for directing pressurized gas generally downwardly into said second receptacle means and around said eighth conduit means;
tenth conduit means extending from said fourth conduit means to said second nozzle unit;
first valve means in said first conduit means; ;
second valve means in said second conduit means;
third valve means in said third conduit means;
fourth valve means in said fourth conduit means;
fifth valve means in said fifth conduit means;
sixth valve means in said sixth conduit means;
seventh valve means in said seventh conduit means;
eighth valve means in said eighth conduit means;
ninth valve means in said ninth conduit means; and
tenth valve means in said tenth conduit means.

8. An apparatus as described in claim 7:
wherein said third conduit means is connected with said first filter so as to enable gas from the atmosphere to bypass the cylindrical filter units of said first filter in flowing through said first filter to said additional conduit means.

9. An apparatus as described in claim 8 and additionally including:
weight measuring means connected with said first receptacle means;
motor means operably connected with said gas pump means;
a discharge nozzle assembly communicating with said first conduit means and having
a first, laterally flexible conduit portion mounted in fixed relation to said first conduit means,
a second conduit portion mounted for vertical telescoping movement on and beneath said first conduit portion,
a third filter having a plurality of parallel, cylindrically walled, fabric filter units, a coupling mounted on the lower end of said second conduit portion, and
a flexible vent conduit extending from said coupling to said third filter;
a fourth filter in said fourth conduit means between said fourth valve means and said gas pump means;
eleventh conduit means extending from said eighth conduit means to said first receptacle means;
eleventh valve means in said eleventh conduit means; and
skid means supporting said apparatus for movement as a unit.

10. An apparatus as described in claim 9 further including:
twelfth valve means in said discharge nozzle assembly for controlling flow through said first conduit portion thereof;

thirteenth valve means in said discharge nozzle assembly for controlling flow through said flexible vent conduit thereof; and fourteenth valve means in said eighth conduit means disposed between said eighth valve means and said third filter.

References Cited by the Examiner
UNITED STATES PATENTS

| | | | |
|---|---|---|---|
| 1,385,870 | 7/1921 | Giesler | 302—59 |
| 2,975,000 | 3/1961 | Davis | 302—17 |
| 3,103,389 | 10/1963 | Knight | 302—53 |

EVON C. BLUNK, *Primary Examiner.*

H. C. HORNSBY, *Assistant Examiner.*